United States Patent
Kim

(10) Patent No.: US 10,133,376 B2
(45) Date of Patent: Nov. 20, 2018

(54) TOUCH SENSOR INTEGRATED DISPLAY DEVICE WITH MULTIPLE PLANARIZATION LAYERS

(71) Applicant: LG Display Co., Ltd., Seoul (KR)

(72) Inventor: Byoungwoo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 387 days.

(21) Appl. No.: 14/675,445

(22) Filed: Mar. 31, 2015

(65) Prior Publication Data

US 2016/0291746 A1    Oct. 6, 2016

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 2010/0193257 A1* | 8/2010 | Hotelling | | G06F 3/0412 178/18.06 |
| 2010/0194707 A1* | 8/2010 | Hotelling | | G06F 3/0412 345/173 |
| 2011/0090194 A1* | 4/2011 | Chang | | G06F 3/0412 345/207 |
| 2015/0084911 A1* | 3/2015 | Stronks | | G06F 3/0416 345/174 |
| 2016/0026291 A1* | 1/2016 | Zhao | | G06F 3/044 345/174 |

* cited by examiner

*Primary Examiner* — Matthew Yeung
(74) *Attorney, Agent, or Firm* — Fenwick & West LLP

(57) ABSTRACT

A touch sensor integrated display device includes a plurality of common electrode blocks serving as touch-sensing regions and/or touch-driving regions. Conductive lines connected to the common electrode blocks are placed under the common electrode blocks and the pixel electrodes of the pixels, and they are routed across the active area, directly toward an inactive area where drive-integrated circuits are located. The conductive lines are positioned under one or more planarization layers, and are connected to the corresponding common electrode blocks via one or more contact holes.

20 Claims, 12 Drawing Sheets

TOUCH SENSOR INTEGRATED DISPLAY DEVICE WITH MULTIPLE PLANARIZATION LAYERS

BACKGROUND OF THE INVENTION

Field of the Invention

The present disclosure generally relates to a display device, and more particularly to a display device configured for advanced mutual capacitance touch-sensing and a method for manufacturing the same.

Description of the Related Art

With ease of use and versatility in operation, touch sensor have been one of the most popular user input mechanism in a variety of electronic devices. In particular, touch screens allow a user to interact with a device by touching the screen using a finger, stylus or other object at a location often dictated by a user interface (UI) displayed on flat panel displays, such as liquid crystal displays (LCDs) or organic light emitting diode (OLED) displays.

Conventionally, a substrate with a matrix of touch-driving lines and touch-sensing lines can be overlaid across a display to provide touch-sensing functionality. However, placing a separate touch panel on the display panel adds thickness and weight to the display device. As such, attempts have been made to integrate some of the touch sensor components within the stacks of layers that form the display pixels of the device. However, integrating touch sensor components within the display pixel often leads to compromises in the display qualities.

SUMMARY

The present disclosure generally relates to display devices provided with touch-sensing functionality, and more particularly, to configurations of touch sensor components within a display device.

In a display device, some elements used in relation with a display functionality can be configured to recognize touch inputs on the screen. For instance, some integrated circuits (ICs) may be configured to provide signals for operating the display pixels as well as signals necessary for sensing user inputs. Similarly, a part of storage capacitors and/or electrode in display pixels can be grouped together, and operate as a part of a touch sensor. In this way, display devices can be manufactured using fewer parts and/or processing steps, and have lighter weight with thinner profile. Also, the touch-sensing functionality enabled display device can be provided without compromises in the display functionality.

However, fine-tuning of the touch-sensing and the display functionalities is especially challenging in an in-plane-switching (IPS) mode and a fringe-field-switching (FFS) mode LCD displays as the electrodes for controlling the orientation of the liquid crystal molecules are provided on one side of the liquid crystal layer.

Accordingly, a touch recognition enabled display is provided with a number of groups of pixels, in which each pixel is provided with a storage capacitor configured with a pixel electrode and a common electrode block. Each common electrode block is shared among the pixels in the same group. Each pixel is provided with a thin-film transistor (TFT), which includes a gate connected to a gate line, a source connected to a data line and a drain connected to the pixel electrode of the corresponding pixel. The display further includes a plurality of common signal lines placed under one or more planarization layers that separate the common signal lines from the pixel electrode and the common electrode blocks. Each of the common signal lines is arranged to overlap one of the data lines in the panel and connected to the common electrode block of one of the pixel groups.

In some embodiments, the common electrode blocks are configured in a self-capacitance touch recognition system. In some other embodiments, the common electrode blocks are configured in a mutual-capacitance touch recognition system.

A common voltage signal is provided on the common electrode blocks during the display period. During a touch-sensing period, however, signals for touch sensing functionality are provided to the common electrode blocks. Accordingly, changes in mutual capacitances generated between the touch-driving blocks and the touch-sensing blocks can be measured to identify user inputs.

Regardless of which type of touch recognition system is implemented with the common electrode blocks, the common signal lines and the data lines are arranged substantially parallel to each other, and are routed toward the drive integrated circuits in the inactive area of the display device.

In some embodiments, the touch recognition enabled display further comprises a plurality of dummy common signal lines, which are positioned in the same layer as the common signal lines. Each dummy common signal line is also arranged to overlap with one of the data lines, and it is connected to the common electrode block of one of the pixel groups.

In some embodiments, the common signal lines and the dummy common signal lines are positioned under the TFTs of the pixels. In such embodiments, a lower planarization layer is interposed between the common signal lines and the layer of TFTs. Also, an upper planarization layer is interposed between the layer of TFTs and the common electrode blocks. Since the lower planarization layer is formed under the TFTs, the lower planarization may be formed of an inorganic material and the upper planarization layer is formed of an organic material. TO withstand the processes involved in fabricating the TFTs, the lower planarization layer may have higher thermal stability than the upper planarization layer.

In the embodiments where the common signal lines are provided under the TFTs, the touch recognition enabled display further comprises a plurality of bypass lines for connecting the common signal lines to the corresponding common electrode block. The bypass lines can be positioned in the same layer as the gate lines. In the embodiments with dummy common signal lines, the dummy common signal lines can also be connected to the bypass line so that they can be connected to the common electrode block of one of the pixel groups.

In some other embodiments, the plurality of common signal lines and the plurality of dummy common signal lines are sandwiched between a lower planarization layer and an upper planarization layer. The lower planarization layer covers the TFTs of the pixels. The upper planarization layer covers the plurality of common signal lines and the plurality of dummy common signal lines. Each of the common signal lines and each of the dummy common signal lines are connected to the common electrode block of one of the pixel groups via a contact hole through the upper planarization layer.

In the embodiments disclosed in the present disclosure, the common signal lines are arranged parallel to the data line and routed directly towards the inactive area across the active area. By routing the common signal lines directly across the active area, the size of the inactive area at the side of the panel can be reduced. Further, the thickness of the passivation layer between the pixel electrode PXL and the common electrode blocks can be kept minimal to increase the capacitance of the pixel. Since, the common signal lines can be spaced farther away from the common electrode blocks, they can be provided with a desired thickness to decrease RC delays during touch-sensing period. In addition, there is no fringe field generated between the common electrode blocks and the common signal lines as the common electrode blocks positioned above the common signal lines. This effectively solves the light leakage problem caused by having the common signal lines in the same layer as the pixel electrode PXL.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

The following description includes embodiments described in the context of LCDs, in particular the In-Plane-Switching (IPS) mode LCD and the Fringe-Field-Switching (FFS) mode LCD, in which the common electrodes and the pixel electrodes of the pixels are arranged on one of the substrates that enclose the liquid crystal layer.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the structures to a particular direction or a particular coordinate system.

Furthermore, although specific materials and types of materials may be included in the descriptions of example embodiments, one skilled in the art will understand that other materials that achieve the same function can be used. For example, it should be understood that a "conductive layer" as described in the examples below can be a layer and a stack of layers formed of any electrically conductive material such as a metal, a carbon based material, a composite conductive material and the like.

Figure 1:
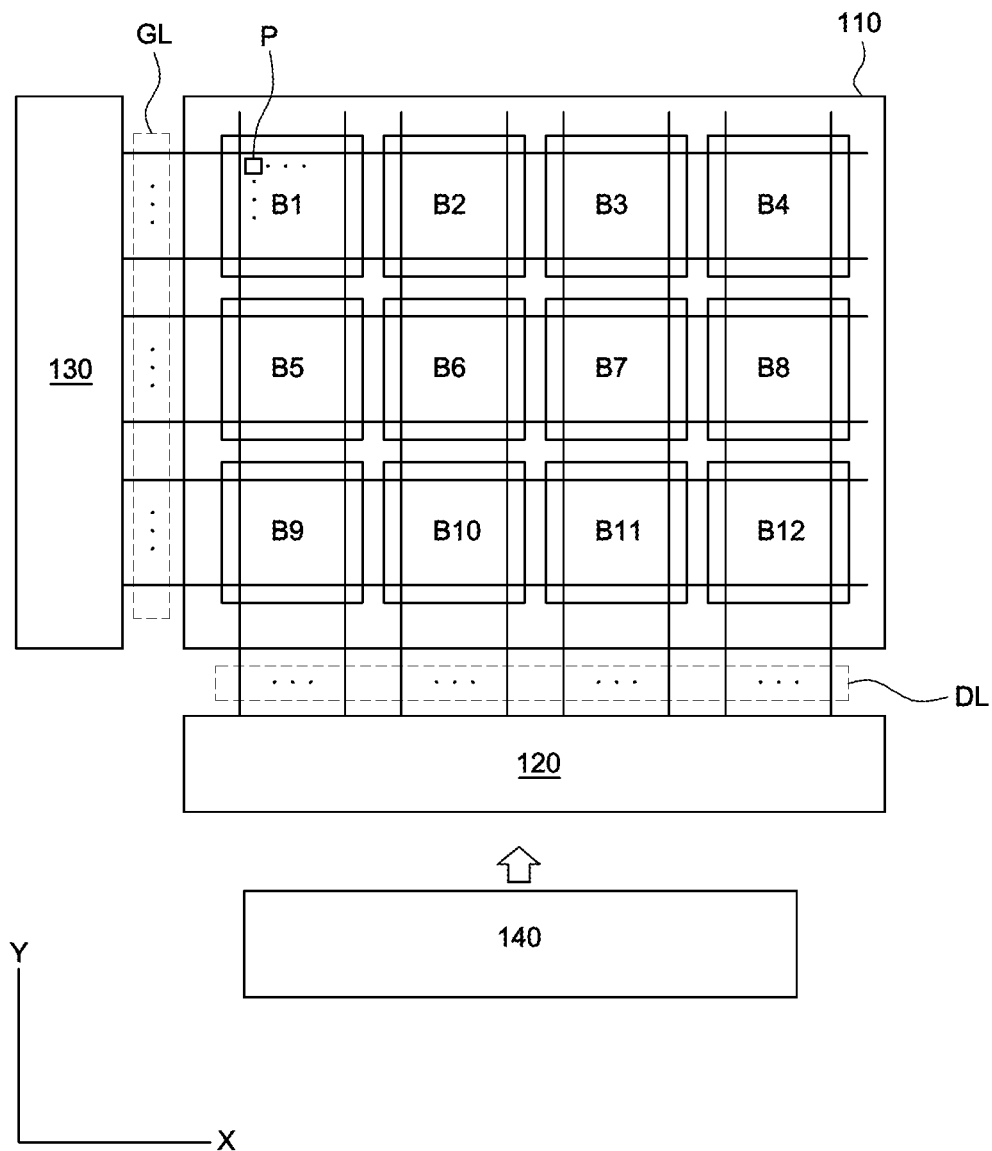
FIG. 1 illustrates an exemplary touch sensor integrated display according to an embodiment of the disclosure.

FIG. 1 schematically illustrates a configuration of a display device 100 with an integrated touch screen according to an embodiment of the present invention. Referring to FIG. 1, the touch sensor integrated display device 100 includes a substrate 110 provided with a plurality of pixels that are connected to the data lines DL and the gate lines GL. In the area outside the active area, which may be referred to as the inactive area, a data drive integrated circuit 120 and a gate drive integrated circuit 130 are configured to provide data signals and the gate signals to the data lines DL and the gate lines GL, respectively. The data-drive IC 120 and the gate-drive IC 130 transmits various display control signals, for example, a gate signal, a common voltage signal and a data signal, to operate display pixels in the active area.

Each of the pixels "P" includes a thin-film-transistor (TFT) with a gate, a source and a drain. Each pixel also includes a capacitor that is formed with a pixel electrode and a common electrode. The gate of the TFT is connected to a gate line GL, the source of the TFT is connected to the data line DL and the drain of the TFT is connected to the pixel electrode of the respective pixel.

At least some elements of a touch sensor are built in an active area of the substrate 110 where the pixels of the display device 100 are located. That is, the pixels include capacitive elements or electrodes, that can operate to carry out the display functionality and that can also operate to carry out the touch-sensing functionality.

In the display device depicted in FIG. 1, a common electrode used for controlling the liquid crystal molecules of the pixels is provided as a plurality of common electrode blocks (B1-B12), and a touch drive integrated circuit 140 is configured to provide touch-sensing related signals to each of the common electrode blocks so that they can be used in sensing touch inputs on the display device 100.

The touch-drive IC 140 may be configured to transmit and receive various touch sense functionality related signals to and from the data-drive IC 120. In some embodiments, all of the data-drive IC 120, the gate-drive IC 130 and the touch-drive IC 140 may be provided on the substrate 110. In some other embodiments, some of the drive ICs may be provided on a separate printed circuit board connected to the substrate

110. Although the data-drive IC 120, the gate-drive IC 130 and the touch-drive IC 140 are illustrated as discrete components in the display device 100, some or all of these drive ICs may be integrated with one another as a single component. For instance, the data drive IC 130 and the touch-drive IC 140 may be provided on the same printed circuit board, which is connected to the substrate 110. Also, the touch-drive IC 140 may be provided as a part of the data drive IC 130. The signals from the display-drive IC 120 and the touch-drive IC 140 are provided to the common electrode blocks via a plurality of common signal lines.

Figure 2A:
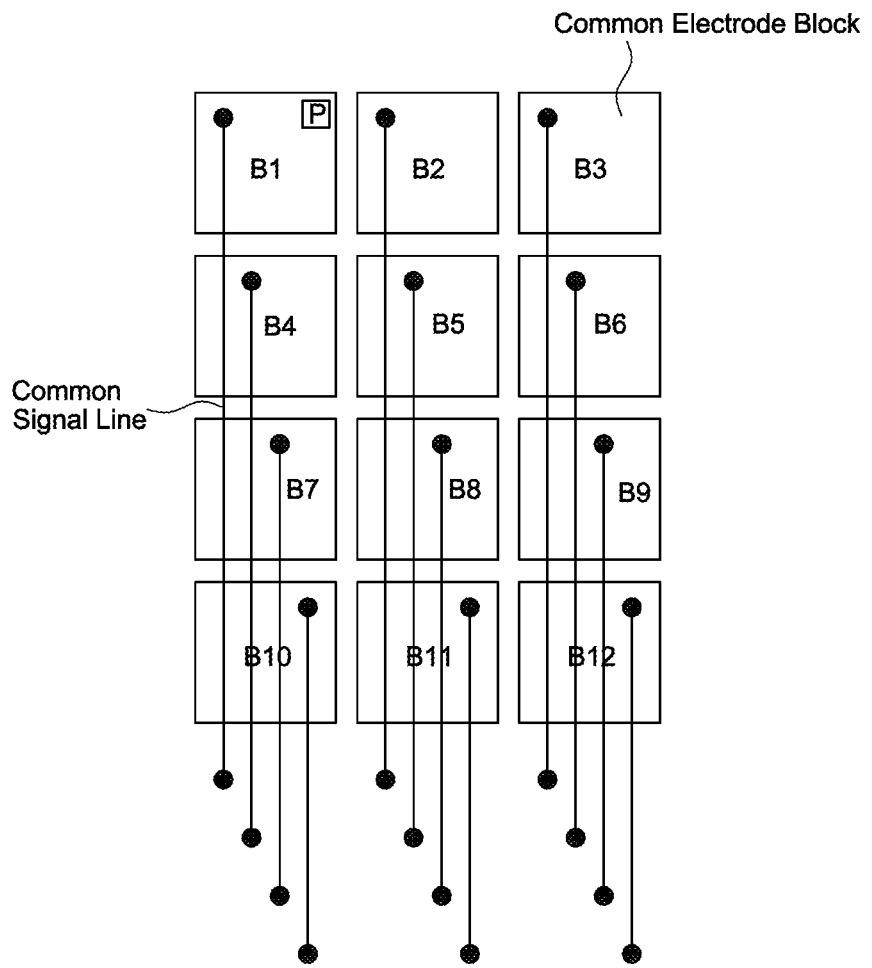
FIG. 2A is a schematic illustration of the common electrode blocks and the common signal lines in an exemplary touch sensor integrated display device that is configured to operate in the self-capacitance mode, according to an embodiment of the disclosure.
Figure 2B:
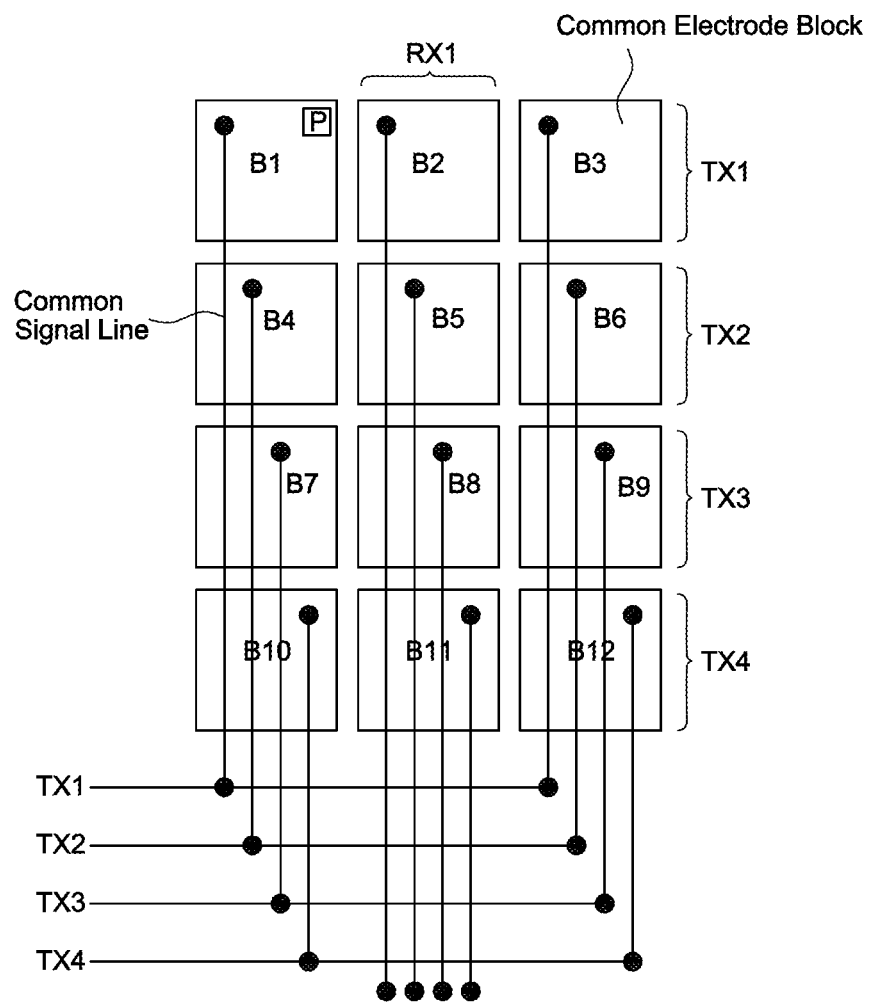
FIG. 2B is a schematic illustration of the common electrode blocks and the common signal lines in an exemplary touch sensor integrated display device that is configured to operate in the mutual-capacitance mode, according to an embodiment of the disclosure.

FIGS. 2A and 2B illustrate exemplary configurations of the common electrode blocks and the common signal lines. In particular, FIG. 2A illustrates an exemplary configuration of common electrode blocks and the common signal lines for a self-capacitance touch recognition system. In the self-capacitance touch recognition system, each common electrode blocks function as a touch sense electrode with a unique coordinate, and thus the change in the capacitance on each of the common electrode blocks can be used to detect the location of the touch inputs on the display device 100. To achieve this, each common electrode block is configured to communicate with the display-drive IC 120 and the touch-drive IC 140 separately from other common electrode blocks by using an independent common signal line.

FIG. 2B illustrates an exemplary configuration of common electrode blocks and the common signal lines for a mutual-capacitance touch recognition system. In a mutual-capacitance touch recognition system, the common electrode blocks are selectively grouped together so that some groups of common electrode blocks serve as touch-driving electrodes and some other groups of common electrode blocks serve as touch-sensing electrodes. Unlike the self-capacitance touch recognition system, the mutual-capacitance touch recognition system relies on the changes in capacitance between a pair of touch-driving electrode and a touch-sensing electrode to detect the location of the touch inputs on the display device 100. To achieve this, sets of common signal lines can be grouped together such that each group of common electrode blocks arranged in one direction (e.g., X-direction) collectively forms a touch-driving line (TX line), and each group of common electrode blocks arranged in another direction (e.g., Y-direction) collectively forms a touch-sensing line (RX line).

For example, the common signal lines from the common electrode blocks B1 and B3 are grouped together as illustrated in FIG. 2B, so that the first touch-driving line TX1 is formed in X-direction. Similarly, the common signal lines from the common electrode blocks B4 and B6, the common electrode blocks B7 and B9, and the common electrode blocks B10 and B12 are grouped together to form touch-driving lines TX2, TX3 and TX4, respectively. The touch-sensing line RX is formed in Y-direction by grouping the common signal lines from the common electrode blocks B2, B5, B8 and B11. The TX lines TX1-TX4 run parallel to the gate lines GL, and the touch-sensing line RX runs parallel to the data lines DL. In this way, a mutual capacitance is formed at intersections between the TX lines and the Rx line. As shown in FIG. 2B, the common signal lines from the common electrode blocks are routed directly across the active area, and they are grouped together to form either the TX lines or the RX lines.

For sake of clarity, only 12 common electrode blocks are used to implement the touch-sensing regions in the display device 100 in the examples of the present disclosure. However, it should be understood that the number of common electrode blocks is not limited as such, and the common electrode of the display device can be divided into additional number of common electrode blocks. Also, it should be noted that the size of individual pixels may be much smaller than the size of an individual unit of touch sense region to be provided in the display device 100. Accordingly, the size of each common electrode block can be larger than the size of the pixel. In other words, a single common electrode block can be shared by several pixels, even though each of those pixels is provided with an individual pixel electrode.

Figure 3:
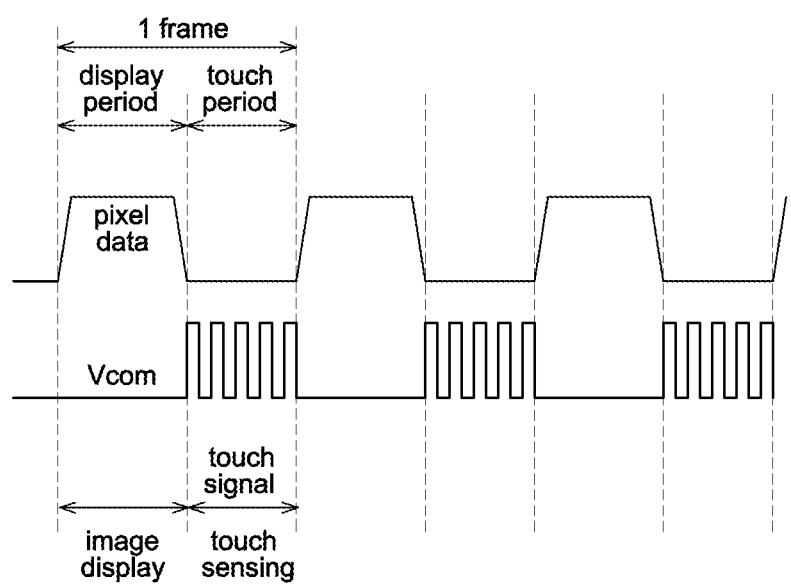
FIG. 3 illustrates exemplary signals applied to the common electrode blocks of the pixels during a display period and during a touch sense period according to embodiments of the disclosure.

FIG. 3 shows example signals applied through the common signal lines to the common electrode blocks during a display period and during a touch-sensing period. Since the common electrode blocks are also used as the touch electrode, they are provided with signals related to display functionality for a certain period and provided with signals related to touch recognition functionality for a certain period. That is, one frame period, which is defined by the vertical sync signal, is divided into a display period and a touch-sensing period.

The display period can only take a portion of one frame period. That is, the pixels of the display device 100 may be refreshed with a new frame of image data in every predetermined period of time. However, the time in which the gate signals and the data signals are provided on the gate lines and the data lines for charging the pixels with new image data may be shorter than the predetermined refreshing period. The period remaining before charging the pixels with a new frame of data can be used for preparing the pixels to receive new image data and for recognition of touch inputs on the screen. For instance, each frame can be 16.6 ms, in which about 12 ms is dedicated for the display period. The rest is used for carrying out the touch-sensing functionality and for preparing the pixels to receive a new frame of image data.

As mentioned, the common voltage signal is transmitted from the data-drive IC 120 to the common electrode blocks via the common signal lines during the display period. The common voltage signal may be in the form of a pulse signal that swings between a positive voltage and a negative voltage to perform LCD inversion.

In the touch period, the touch-driving signal is transmitted from the touch-drive IC 140 to at least some of the common electrode blocks via the common signal lines. In cases where the common electrode blocks are configured as the self-capacitance touch recognition system, each of the common electrode blocks are provided with touch-driving pulses, and the signals from each of the common electrode blocks are analyzed to determine whether a touch input was registered on a particular common electrode block. More specifically, in the self-capacitive touch recognition system, charging or discharging of the touch-driving pulse on the common electrode blocks can be used to determine touch inputs on the common electrode blocks. For example, a change in the capacitance value upon a touch input changes the time in which the voltage slope on the common electrode block. Such a change on each of the common electrode blocks can be analyzed to determine the location of touch input on the display device 100.

In cases where the common electrode blocks are configured as the mutual-capacitance touch recognition system, groups of common electrode blocks that are configured as the touch-driving lines (TX) are provided with the touch-driving pulses, and groups of common electrode blocks that are configured as the touch-sensing lines (RX) are provided with a touch reference voltage signal. The presence of a touch input is detected based on a change in the charge of the RX lines.

In the example shown in FIG. 2B, each of the TX lines was defined by a group of common electrode blocks arranged in a row (X-direction), and each of the RX lines was defined by a group of common electrode blocks arranged in a column (Y-direction). However, the arrangement of the common electrode blocks is not limited as such, and may be arranged in a various other ways depending on the desired layout of the TX and RX lines in the display device 100. The number of TX lines implemented with the common electrode blocks arranged in a single row as well as the number of RX lines implemented with the common electrode blocks arranged in a single column can vary depending on various factors. For instance, the common electrode blocks arranged in a single row can be used to provide multiple TX lines, and the common electrode blocks arranged in a single column can be used to provide multiple RX lines based on the touch scanning frequency and the accuracy as well as the size of the display device 100.

Also, the RX line in the mutual-capacitance touch recognition system can be formed with a common electrode block that is larger than the common electrode blocks that forms the TX lines. For instance, rather than forming an RX line with a plurality of common electrode blocks arranged in column direction, a single large common electrode block that extends across the active area in the column direction can be used as a RX line.

In order to improve the touch-sensing accuracy at the edges of the display device 100, the common signal lines from the common electrode blocks positioned at each of the far most ends of the active area (i.e., left and right ends) can be grouped together such that RX lines are formed at the far most ends of the active area. In this way, touch inputs made by the object with a very smaller touch point (e.g., 2.5Φ) than a typical size of a finger can be recognized at the edges of the display device 100.

To further improve the performance of the touch-sensing capability, the width of the common electrode blocks that serve as the RX lines at the far most end of the display device 100 may be different from the width of other touch-sensing blocks 114 in the other areas of the panel 110. Configuring the common electrode blocks at the farthest ends of the display device 100 as the RX lines allows for more accurate touch input recognition even from the very end portions of the active area. However, this means that the location of the common electrode blocks that serve as the TX line will shift away from the edges by the width of the common electrode blocks serving as the RX line at the edges. Also, each TX line does not fully extends across the RX lines positioned at the edges. Accordingly, the width of the common electrode blocks at the edges may be narrower than the width of the common electrode blocks at other areas of the active area. For instance, the width of the common electrode blocks, measured in X-direction, at the edges of the active area may be ½ of other common electrode blocks.

To improve the touch-sensing accuracy at the upper and lower edges of the panel 110, the common electrode blocks at the upper and lower edges of the panel 110 can have a reduced width, measured in y-direction, as compared to other common electrode blocks at other areas of the panel 110. This way, narrower TX channels can be provided at the top and bottom edges of the panel 110. The number of TX and RX channels in the panel 110 can be adjusted according to the arrangement and sizes of the common electrode blocks in the active area.

Referring back to FIGS. 2A and 2B, the signals provided to the common electrode blocks during the display period and during the touch-sensing period are transmitted from the drive ICs in the inactive area to the common electrode blocks in the active area via a plurality of common signal lines.

Each of the common electrode blocks in the self-capacitance touch recognition system depicted in FIG. 2A is provided with an independent common signal line so that each common electrode block can act as a touch-sensing region with a unique coordinate within the active area.

In the mutual-capacitance touch recognition system depicted in FIG. 2B, each of the common electrode blocks is also connected with at least one common signal line. The common signal lines extend in the same direction as the data lines DL toward the inactive area. Once the common signal lines are routed outside the active area, the common signal lines are selectively grouped together so that the common electrode blocks form touch-driving regions and touch-sensing regions. As shown in FIG. 2B, the common signal lines from the common electrode blocks that serve as the touch-driving regions and the touch-sensing regions are arranged parallel to each other and routed in the same direction. Grouping of the common signal lines is made outside the active area.

In both the self-capacitance and the mutual-capacitance touch recognition systems, each of the common electrode blocks are connected with at least one common signal line, which extends parallel to one another and routed outside the active area in the same direction as the data lines DL. Arranging the common signal lines parallel to each other and having them routed across the active area toward the drive ICs allows to eliminate the space for routing the common signal lines from the sides of the display device, and thereby reducing the size of the bezel.

When routing the common signal lines across the active area, the common signal lines, except the ones that are connected to the common electrode blocks of the row or the column closest to the drive IC, are routed across other common electrode blocks. For instance, the common signal line connected to the common electrode block B1 simply extends across the common electrode blocks B4, B7 and B10 to reach the inactive area where the drive ICs are located, without being in contact with the common electrode blocks in the route.

In these settings, the common signal lines cannot be positioned immediately above or below the common electrode blocks to directly interface with the surface of the common electrode block. In such a configuration, the common signal lines will be in contact with other common electrode blocks along path toward the inactive area. It will result in disrupting the unique coordinates of the common electrode blocks in the self-capacitance touch recognition system or breaking the formation of TX/RX lines in the mutual-capacitance touch recognition system.

When the common signal lines are positioned in the same layer as the pixel electrode, coupling generated between the common signal lines and the pixel electrode may cause various display defect when the common signal lines are used to modulate common electrode blocks during the touch-sensing period. That is, any reduction in the spacing between the common electrode blocks and the pixel electrode PXL for higher storage capacitance will also result in higher coupling capacitance between the common electrode blocks and the common signal lines.

Also, the common signal lines can be placed under the split area between the two adjacent common electrode blocks for lowering the coupling capacitance. However, such configuration can generates unwanted fringe field between the common electrode blocks and the common signal lines. This fringe field affects the LC molecules, leading to undesired light leakage. Thus, in order to route the common signal lines across the active area of the display device 100, the plane level of the common signal lines should be different from the plane levels of the pixel electrode and the common electrode blocks.

Placing the common signal lines between the layer of pixel electrode and the layer of common electrode blocks poses similar problems. In such a configuration, an insulation layer should be provided between the layer of the common electrode blocks and the layer of common signal lines. At the basic level, the thickness of the common signal lines cannot be greater than the thickness of the insulation layer between the layer of pixel electrodes and the layer of common electrode blocks. Also, the thickness of the insulation layer interposed between the pixel electrode and the common electrode blocks is limited in the IPS or the FFS mode LCD device, which in turn limits the thickness of the common signal lines.

For instance, when the thickness of the insulation layer interposed between the pixel electrode and the common electrode blocks is about 3000 Å, the thickness of the common signal lines is limited to about 2500 Å if the common signal lines are to be placed between the common electrode blocks and the pixel electrode. The resistance varies by the thickness of the common signal lines. As such, limiting the thickness of the common signal lines increases the resistance, and the common signal lines may not be able to transmit signals from the drive ICs to the common electrode blocks, especially as the size of the active area becomes larger.

Accordingly, in the embodiments of the display devices described in the present disclosure, the common signal lines are positioned such that they are sufficiently spaced apart from the pixel electrode and the common electrode blocks. In this way, the width and thickness of the common signal lines may not be limited by the distance between the pixel electrode and the common electrode blocks. To this end, one or more planarization layer is provided between the common signal lines and the common electrode blocks, and the common signal lines are connected to the corresponding common electrode blocks via the contact holes through the planarization layers. In such settings, each of the common signal lines connected to a common electrode block can be routed across the active area without contacting other common electrode blocks placed along its route. The common signal lines can simply bypass the common electrode blocks along the path to the drive-ICs in the active area.

Figure 4A:
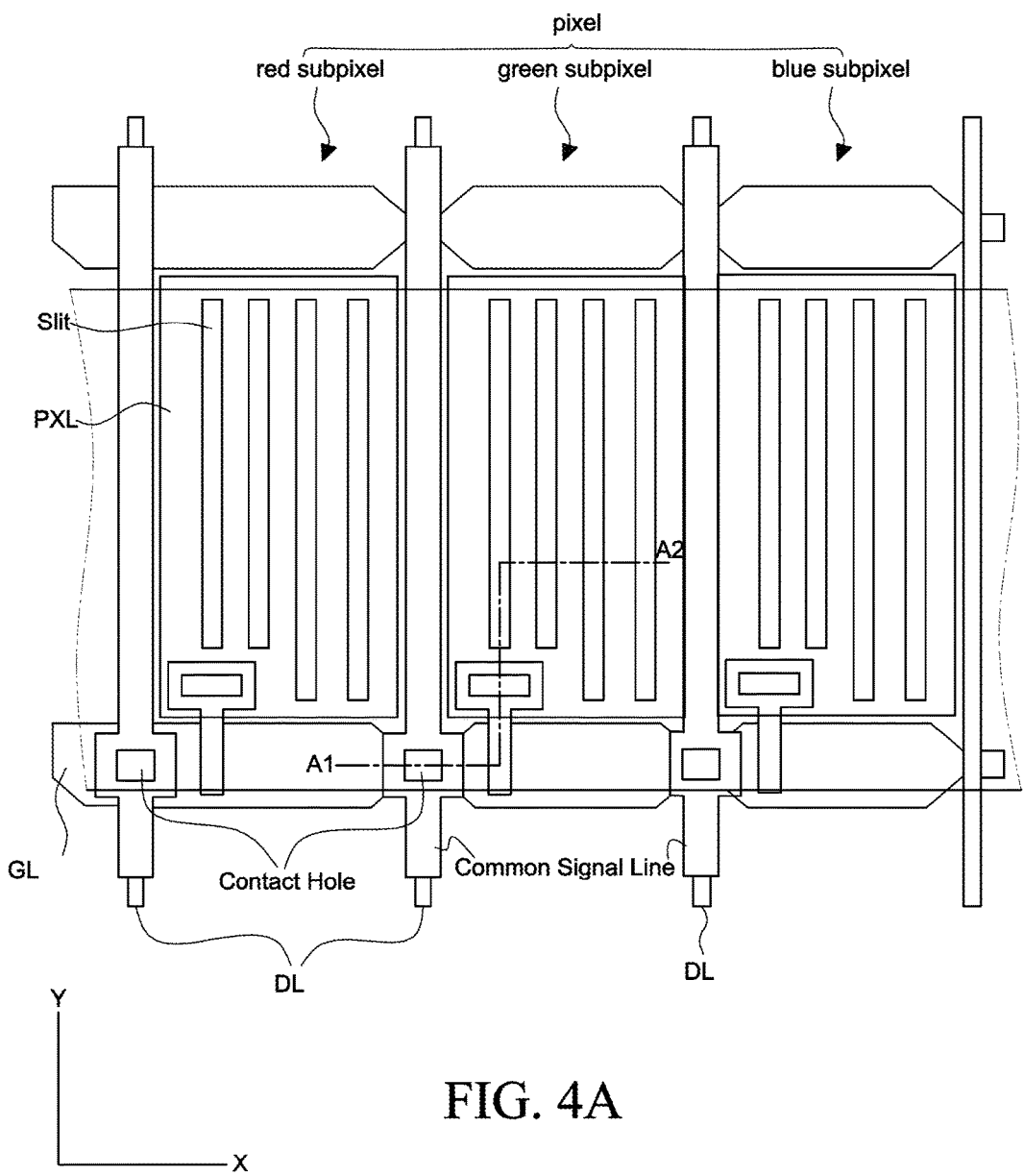
FIG. 4A is a plan view of an exemplary touch sensor integrated display device having the common signal lines disposed within the planarization layer covering the thin-film-transistors according to an embodiment of the disclosure.
Figure 4B:
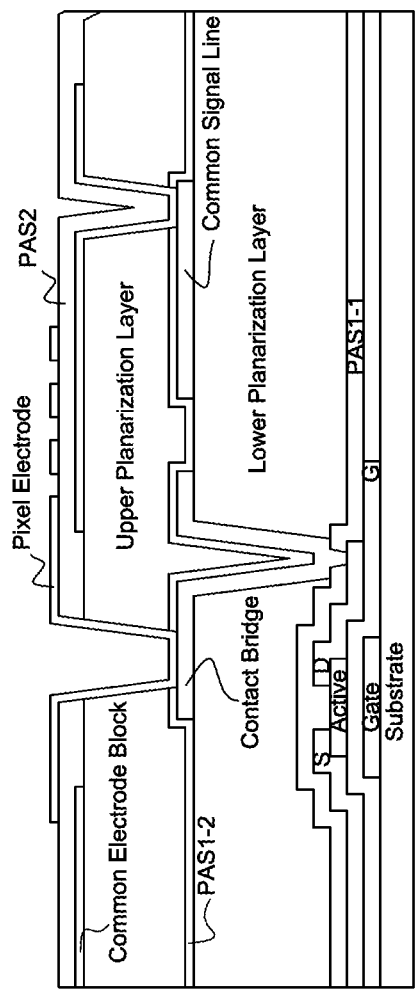
FIG. 4B is a cross-sectional view of the touch sensor integrated display device depicted in FIG. 4A.

FIG. 4A is a plane view that illustrates an exemplary configuration of the common signal lines according to an embodiment in which the common signal lines are disposed within the planarization layer interposed between the TFTs of the pixels and the common electrode blocks. FIG. 4B is a cross-sectional view that illustrates the configuration of the common signal lines shown in FIG. 4A.

In FIG. 4A, configuration in the three sub-pixels are depicted for convenience. Each sub-pixel includes a pixel electrode PXL in an area defined by a data line DL extending in Y-axis and a gate line GL extending in X-axis. A thin-film-transistor (TFT) is formed at the intersections of the data lines DL and the gate lines GL. Each TFT is configured with a gate, a source, a drain and a semiconductor layer. The gate of the TFT is extended from, or otherwise connected to the gate line GL. The source is extended from, or otherwise connected to the corresponding data line DL. The drain is connected to the corresponding pixel electrode PXL through a contact hole CH1. The pixel electrode PXL has a plurality of slits at a certain interval. With the slits in the pixel electrode PXL, fringe field is generated between the pixel electrode PXL and the common electrode block to operate the display device 100.

As described above, each of the common signal lines are connected to one common electrode block, and is routed across the active area toward the inactive area where the drive-ICs are located. Because the common signal lines can be routed directly across the active area of the display device 100, each of the common signal lines can be arranged such that a common signal line and a data line DL overlaps with one another. By placing the common signal lines in a different layer form the gate line metal layer and the data line metal layer, and overlaying the common signal lines on the respective data lines, any possible reduction in the aperture of the sub-pixels due to routing of the common signal lines across the active area can be minimized.

In FIG. 4A, a contact hole through the planarization layer between the common electrode block and the common signal line is provided so that the common electrode block disposed over these pixels can contact the common signal line. More specifically, a planarization layer should be provided over the TFTs of the pixels to create a planar surface for the common electrode blocks to be disposed thereon. To this end, an organic material such as photo-acryl (PAC) can be provided over the TFTs of the pixels in the active area with a thickness sufficient to provide a planar surface over the TFTs.

While the contact hole is provided on only one common signal line in FIG. 4A, additional contact holes can be provided on other common signal lines if other common signal are to be connected with the common electrode block disposed thereon. It should be noted that each common electrode block can be shared among a number pixels. As such, the number of data lines can be much greater than the number of common electrode blocks provided in the panel. Therefore, in some embodiments, each common electrode block can be connected to multiple common signal lines. In such embodiments, additional contact holes can be provided on other common signal lines so that they can be in contact with the common electrode block disposed thereon. The location of the contact holes for connecting the additional common signal lines to the common electrode block is not particularly limited, and may be positioned next to the pixels of other rows so long as those pixels are covered by the same common electrode block. Without the contact hole, the common signal lines simply bypasses the common electrode block without any contact thereto.

FIG. 4B illustrates a cross-sectional view at the line A1-A2 depicted in FIG. 4A. Referring to FIG. 4B, the gate of the TFT is disposed on the substrate, and is covered by the gate insulation layer GI. A semiconductor layer is disposed on the gate, with the source and the drain connected at the opposite ends of the channel region. A passivation layer, which is often formed with a thin layer of inorganic materials such as Silicon Nitride (SiNx) and Silicon Oxide (SiOx), covers the source and the drain of the TFT. The thickness of the inorganic passivation layer PAS1-1 may not be sufficient to create a planar surface over the source/drain metal layer. Thus, one or more planarization layer should be provided between the TFT and the layer of the common electrode blocks. To this end, an organic material such as photo-acryl (PAC) can be provided over the TFTs of the pixels in the active area with a thickness sufficient to provide a planar surface over the TFTs.

In order for the common signal lines to be placed within the planarization layer between the TFTs of the pixel and the common electrode blocks, a planar surface above the TFTs is need to place the common signal lines, and another planar surface over the common signal lines is needed to place the common electrode blocks. In other words, the common signal lines can be sandwiched between at least two separately formed planarization layers.

To this end, a lower planarization layer is provided over the TFT to create a planar surface for placing the common signal lines. The metal layer on the lower planarization layer is patterned to provide the common signal lines as well as the contact bridge that connects the drain of the TFT with the pixel electrode. The contact bridge may be in contact with the drain of the TFT through the contact hole through the lower planarization layer and the passivation layer thereunder. The common signal lines as well as the contact bridge on the lower planarization layer may be covered with another passivation layer PAS1-2, which may be formed in a similar fashion as the passivation layer on the source/drain of the TFT. To provide a planar surface for the common electrode blocks, an upper planarization layer is provided over the common signal lines and the contact bridge.

In this way, the common signal lines are sandwiched between the lower planarization layer and the upper planarization layer, which are interposed between the TFTs of the pixels and the common electrode blocks. In the configuration depicted in FIG. 4B, fabrication of the TFTs on the substrate takes place before providing both the lower planarization layer and the upper planarization layer. Therefore, both of the planarization layers are not likely to be affected by the fabrication processes of the TFTs. As such, both planarization layers can be formed of organic material, such as photo-acryl (PAC), with a thickness sufficient to provide a planar surface over the structures thereunder.

The thicknesses of the lower planarization layer and the upper planarization layer are important in at least two respects. First, the lower planarization layer should have a thickness sufficient to provide a planar surface over the source/drain metal layer for the common signal lines to be disposed thereon. The upper planarization layer should also have a thickness sufficient to provide a planar surface over the metal layers of the common signal lines for the common electrode blocks to be disposed thereon.

The thickness of the lower planarization layer should be sufficient so that any couplings between the signal lines (e.g., data lines, gate lines) under the lower planarization layer and the common signal lines can be kept low. Similarly, the thickness of the upper planarization layer should be sufficient so that any couplings between the common signal lines and the common electrode blocks can be kept low. When the distance between the layer of common signal lines and the layer of common electrode blocks is too close, couplings can occur on the common electrode blocks by the bypassing common signal lines, and it may undesirably affect the orientation of the liquid crystal molecules during touch-sensing period and/or hinder the accurate reading of the touch signals.

Accordingly, the thickness of the planarization layers can vary depending on various factors, such as the fabrication process, the material of the planarization layer, the thickness of the structures to be covered by the respective planarization layers. In some embodiments, each of the planarization layers interposed between the common electrode blocks and the TFTs may have a thickness in the range of about 1 μm to about 4 μm, and more preferably in the range of about 2 μm to about 4 nm. In some configurations, the thickness of the lower planarization layer is in the rage of about 1 μm to about 2 nm, and the thickness of the upper planarization layer is in the rage of about 1 μm to about 2 nm.

The embodiment described in reference to FIGS. 4A and 4B has a pixel-top configuration. In this configuration, the pixel electrode PXL is positioned above the passivation layer PAS2 formed over the common electrode blocks. The part of the pixel electrode PXL above the common electrode blocks has a plurality of slits to generate fringe field between the pixel electrode PXL and the common electrode blocks. However, arrangement of the common signal lines sandwiched between the lower and the upper planarization layers can be equally applied in a VCOM-top configuration, where the common electrode blocks are positioned on the pixel electrodes.

Figure 5A:
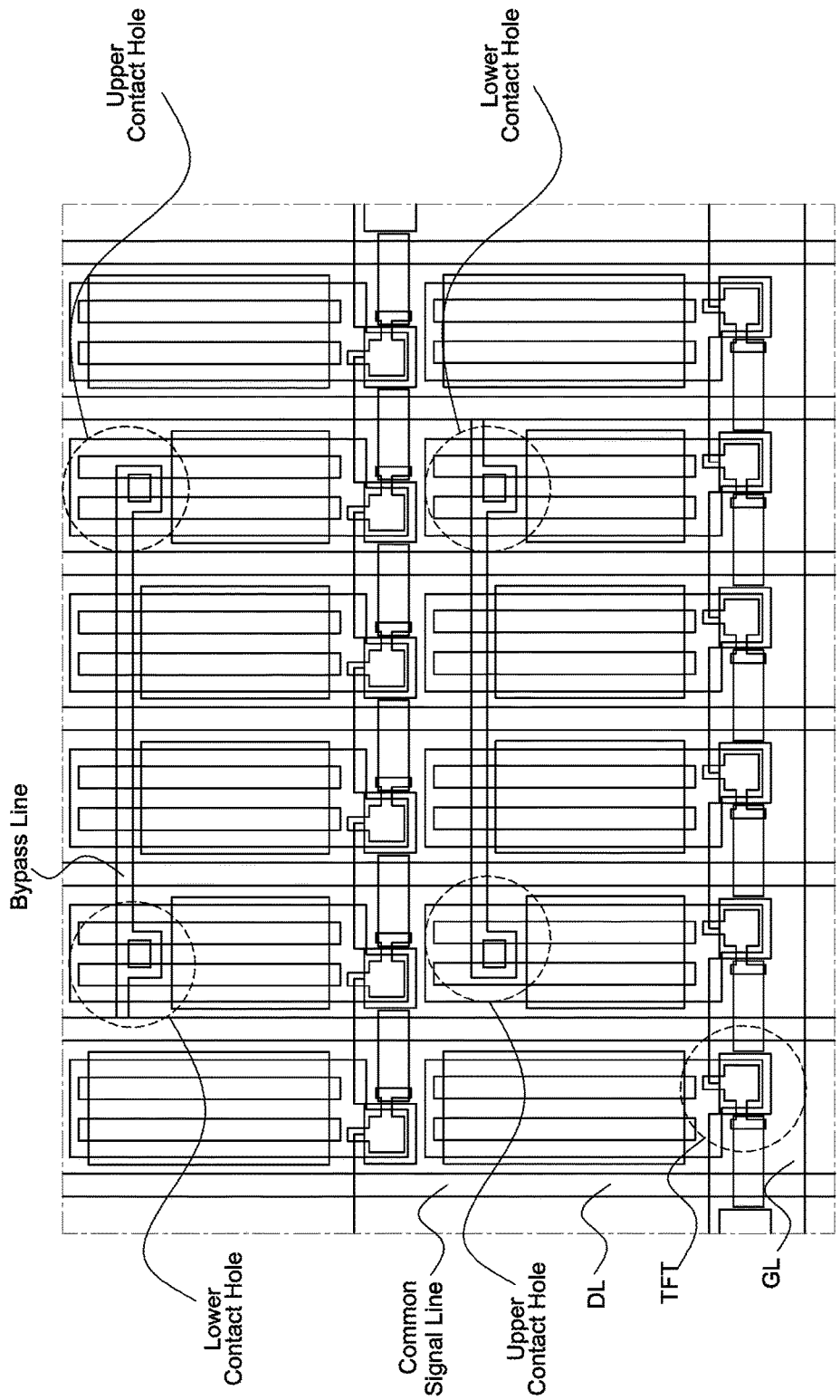
FIG. 5A is a plan view of an exemplary touch sensor integrated display device having the common signal lines disposed under the thin-film-transistors according to an embodiment of the disclosure.
Figure 5B:
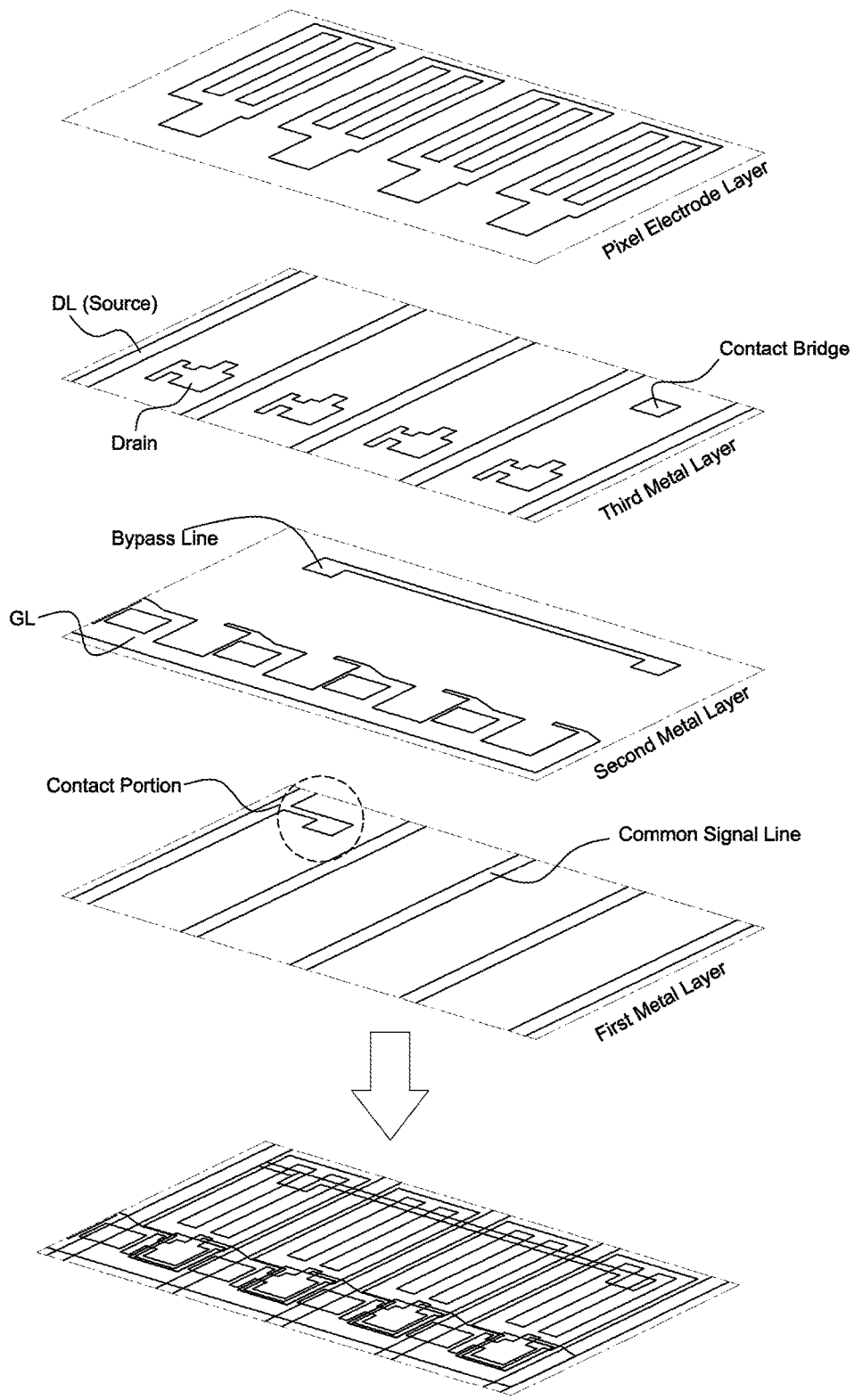
FIG. 5B is a cross-sectional view of the exemplary touch sensor integrated display device depicted in FIG. 5A.
Figure 5C:
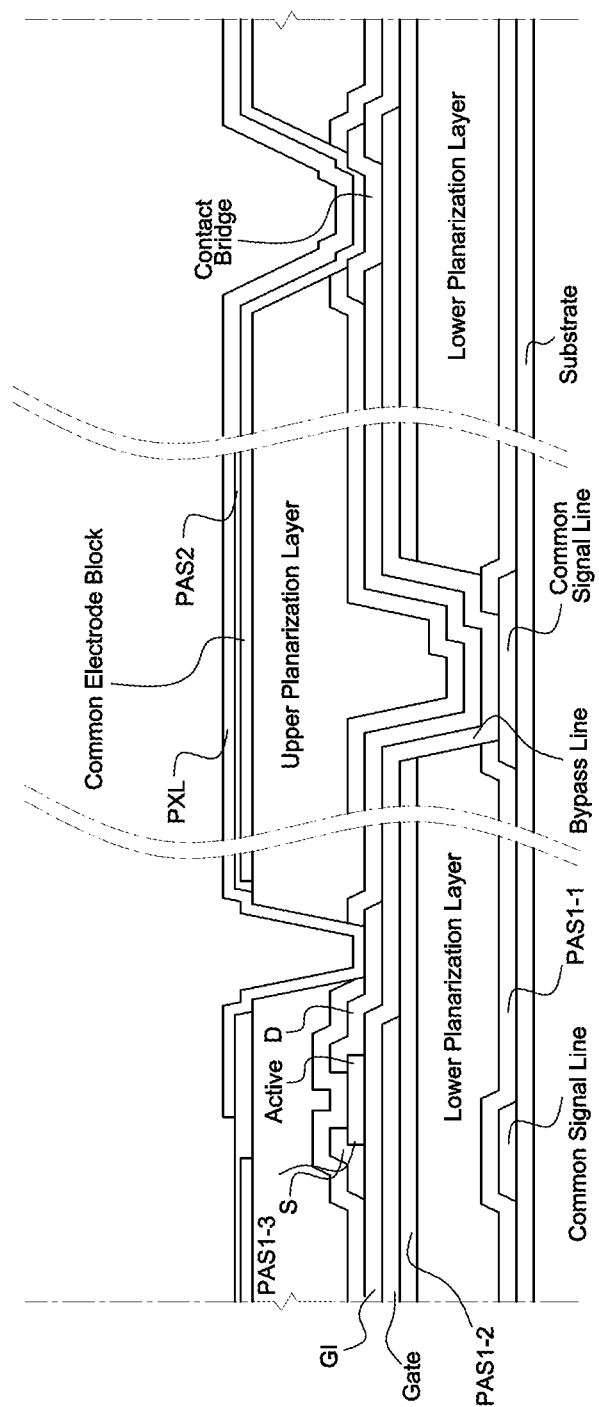
FIG. 5C is a schematic illustration showing the order in which the metal layers are disposed over one another in the exemplary touch sensor integrated display device depicted in FIGS. 5A and 5B.

FIG. 5A is a plane view that illustrates an exemplary configuration of the common signal lines according to an embodiment, in which the common signal lines are disposed below the TFTs of the pixels. FIG. 5B is a cross-sectional view that illustrates the configuration of the common signal lines shown in FIG. 5A. FIG. 5C illustrates the order in which the metal layers are disposed over one another in the exemplary touch sensor integrated display device depicted in FIGS. 5A and 5B.

Referring to FIG. 5A, the common signal lines are arranged to extend in the same direction as the data lines, and each common signal line is positioned to overlap with a data line to minimize reduction in the aperture by the common signal lines. Also, the TFT in the pixel is configured in the similar way as the other embodiments discussed above. That is, the TFT has the bottom gate structure, with the source and drain connected at the opposite ends of the channel. The source of the TFT extends from or otherwise connected to the data line, and the drain is connected to the pixel electrode of the corresponding pixel. The pixel electrode is provided with a plurality of slits to generate fringe field with the overlapping common electrode block.

Unlike the embodiments described above, the common signal lines are placed under the TFTs of the pixels, and they are connected to the corresponding common electrode blocks via contact holes through the planarization layers formed over the TFTs. In this configuration, each common signal line is connected to at least one bypass line that is connected to the corresponding common electrode block. As shown in FIG. 5A, the bypass line can be arranged in a transverse to the common signal lines such that a bypass line extends from one pixel to another pixel. The connection between the bypass line and the common signal line can be made in one pixel region, and the connection between the bypass line and the common electrode block can be made in another pixel region.

Referring to FIGS. 5B and 5C, the common signal lines are provided on the substrate. In this example, the metal layer used in forming the common signal lines may be referred to as the first metal layer and the order of other metal layers may be reference to the first metal layer for convenience of explanation. To provide an array of TFTs on the common signal lines, a lower planarization layer is provided over the common signal lines. The thickness of the lower planarization layer may vary depending on the thickness of the common signal lines. For example, the thickness of the common signal lines may range from about 2500 Å to about 7500 Å and more preferably from about 3500 Å to about 6500 Å, and more preferably from about 4500 Å to about 5500 Å. The thickness of the lower planarization layer may range from about 1 μm to 4 μm, and more preferably from about 1 μm to 3 μm, and more preferably from about 1 μm to 2 μm. In one suitable example, the thickness of the common signal lines may be about 5000 Å, and the thickness of the lower planarization layer may be about 1.2 µm. The thickness of the planarization layer that covers the common signal lines can vary based on various factors, such as the dielectric property, material, fabrication process, and more.

Since the array of TFTs are to be fabricated on the lower planarization layer, the material for the lower planarization layer cannot be the photo-acryl, which are generally used as the planarization layer over the TFTs. Some of the process for fabricating the TFTs may be carried out in high-temperature, and thus the lower planarization layer should be able to sustain its quality even under conditions during the TFT fabrication processes. For example, some of the processes during the fabrication TFTs with oxide semiconductor layer, such as IGZO (indium-Gallium-Zinc-Oxide), may be carried out at about 350 degrees Celsius or more. As such, the lower planarization layer may be formed of material that can maintain the planarizing functionality at more than 350 degrees Celsius, and more preferably between 350 degrees Celsius and 380 degrees Celsius. To this end, silicon based inorganic material that can withstand such high temperature is desirable for the lower planarization layer. The material should also be suitable for processes for covering over the common signal lines as a planarization layer. For instance, inorganic material with high-temperature resistance may be disposed over the common signal lines as the lower planarization layer by using the spin-on-glass (SOG) method.

A passivation layer may be provided between the common signal lines and the lower planarization layer. On the lower planarization layer, the gate lines and the gates of the TFTs are provided with the second metal layer. The bypass lines are also provided on the lower planarization layer with the second metal layer. The semiconductor layer (e.g., oxide, LTPS, a-Si) is patterned on the gate insulation layer, which covers the gate lines, the gates of the TFTs and the bypass lines. The source and drain of the TFT are formed at the opposite ends of the channel region with the third metal layer.

In order to create contact hole for connecting the bypass line with the corresponding common electrode block, a contact bridge, which is formed with the third metal layer, can be placed on the bypass line. To provide a planar surface for placing the common electrode blocks, the upper planarization layer is provided over the TFT and the bypass line. As shown, a passivation layer formed of inorganic material, such as SiNx and/or SiOx, may be interposed between upper planarization layer and the third metal layer. Another passivation layer is interposed between the common electrode blocks and the pixel electrodes provided on the upper planarization layer.

As describe, when the common signal lines are provided under the TFTs, the bypass lines are used to provide connections between the common signal lines and the corresponding common electrode blocks. To this end, each common signal line is in contact with a bypass line via the lower contact hole through the lower planarization layer and the passivation layer thereunder. Also, the connection between the bypass line and the common electrode block is made via the upper contact hole through the upper planarization layer and the passivation layer thereunder. The contact bridge on the bypass line can be exposed through the upper contact hole so that it can be in contact with the common electrode block.

As shown in FIG. 5C, the common signal lines may include a contact portion extended to the location of the lower contact hole. Similarly, the bypass line may include a contact portion at the location of the lower contact hole in the lower planarization layer. Although only one common signal line is provided with the contact portion, other common signal lines may also be provided with the contact portion so that they can be connected to the bypass line. Note that a common electrode block can be connected with multiple common signal lines. In such cases, multiple common signal lines may be connected to a single bypass line, which is connected to the corresponding common electrode block.

Referring back to FIG. 5A, the lower contact hole for connecting the common signal line to the bypass line is provided in one of the pixel, and the upper contact hole for connecting the bypass line to the common electrode block is provided in another pixel. It should be noted that the aperture of pixels are reduced by the bypass line. The aperture of the pixels located at the regions corresponding to the lower contact hole and the upper contact hole may be decreased more than other pixels laid between those regions. Accordingly, the lower contact hole and the upper contact hole may be provided at certain selective pixels. For example, the blue pixel has the lowest luminance as compared to green and red pixels. Thus, the actual amount of luminance decreased by the reduced aperture of the pixel is less for the blue pixel as compared to red and green pixels. Therefore, in some embodiments, the lower contact hole and the upper contact hole may be provide in two adjacent blue pixels.

Placing the lower contact hole and the upper contact hole in a certain repeated order may result in a visible pattern over the active area. Accordingly, some of the bypass lines can be arranged differently from other bypass lines, so that the placing of the contact holes for some bypass lines are different from that of other bypass lines. For instance, the lower contact hole and the upper contact hole for some bypass lines may be placed in pixels positioned in left and right sides, respectively. For some other bypass lines, the lower contact hole and the upper contact hole may be placed in pixels positioned in right and left sides, respectively.

In some embodiments, bypass lines can be arranged such that they extend from the pixel at one end of a common electrode block to the pixel at the opposite end of that common electrode block. Although, much greater number of pixels will be affected by the bypass lines, it can suppress visible patterns. In some embodiments, the lower contact hole and the upper contact hole can be provided in the pixels immediately adjacent to each other. There will be no visible patterns, as the aperture of all pixels will be decreased by the contact holes.

With FIGS. 5A-5C, the embodiments of the display device are described as having the pixel-top configuration. However, the configuration of the common signal lines under the TFTs and the connections to the corresponding common electrode blocks via the bypass lines and contact bridges can be equally applied to the VCOM-top configuration.

In the present disclosure, all of the embodiments have been described as having the common signal lines and the data lines positioned to overlap one another. The width of the common signal lines can be equal to the width of the data lines. However, it should be noted that the width of the common signal lines and the width of the data lines can differ from each other. With the common electrode being provided in a plurality of common electrode blocks, the field at the region between the two adjacent common electrode blocks can be different from other regions on the common electrode block. As such, controlling of the liquid crystal molecules over such regions may be difficult, and the light from the backlight can leak into the pixels near such regions.

Accordingly, a data line and a common signal line can be placed in the region between the two adjacent common electrode blocks. This way, the data line and the common signal line can be used to block the light from the backlight. The width of the data lines and the width of the common signal lines can be adjusted according to the distance between the two adjacent blocks. In this regard, increasing the width of the common signal lines can help reduce the resistance and lower the RC delay on the common signal lines. In the embodiments with the common signal lines disposed under the data lines, the width of the common signal lines can be greater than the width of the data lines. Since the common signal lines are placed further away from the common electrode blocks and the pixel electrodes than the data lines, managing the coupling capacitance may be easier for the common signal lines than the data lines.

The number of data lines in the panel may be much greater than the number of common electrode blocks. Therefore, the common signal lines may be placed only under/over some of the data lines. However, placing the common signal lines to overlap with a data line changes the data line capacitance. In order for the data lines to have uniform data line capacitance, additional common signal lines or dummy common signal lines may be provided in the panel, so that each of the data lines are overlapped by these conductive lines.

The dummy common signal lines refer to the conductive lines formed in the same layer as the common signal line, but not connected to the drive-ICs. As such, the dummy common signal lines do not supply the common voltage signal or the touch related signals, even though they are arranged in the active area in the similar fashion as the real common signal lines. Leaving the dummy common signal lines in floating state can cause electro-static, which may damage the panel. Accordingly, the dummy common signal lines may be configured to be in contact with the common electrode block positioned above.

Figure 6A:
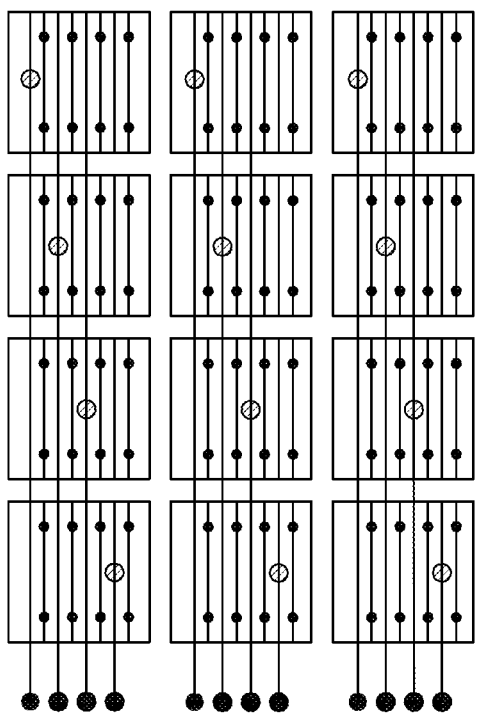
FIG. 6A is a schematic illustration showing an exemplary configuration of the common signal lines and the dummy common signal lines in the touch sensor integrated display devices according to embodiments in which the common signal lines are sandwiched between lower/upper planarization layers.
Figure 6B:
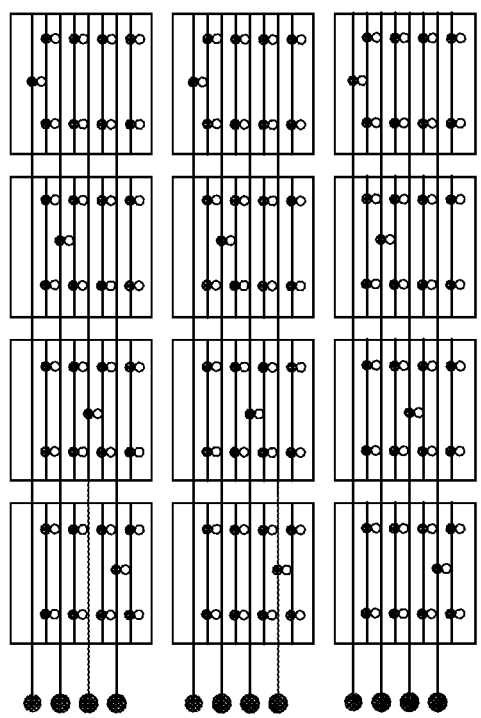
FIG. 6B is a schematic illustration showing an exemplary configuration of the common signal lines and the dummy common signal lines in the touch sensor integrated display devices according to embodiments in which the common signal lines are disposed under the TFTs.
Figure 6C:
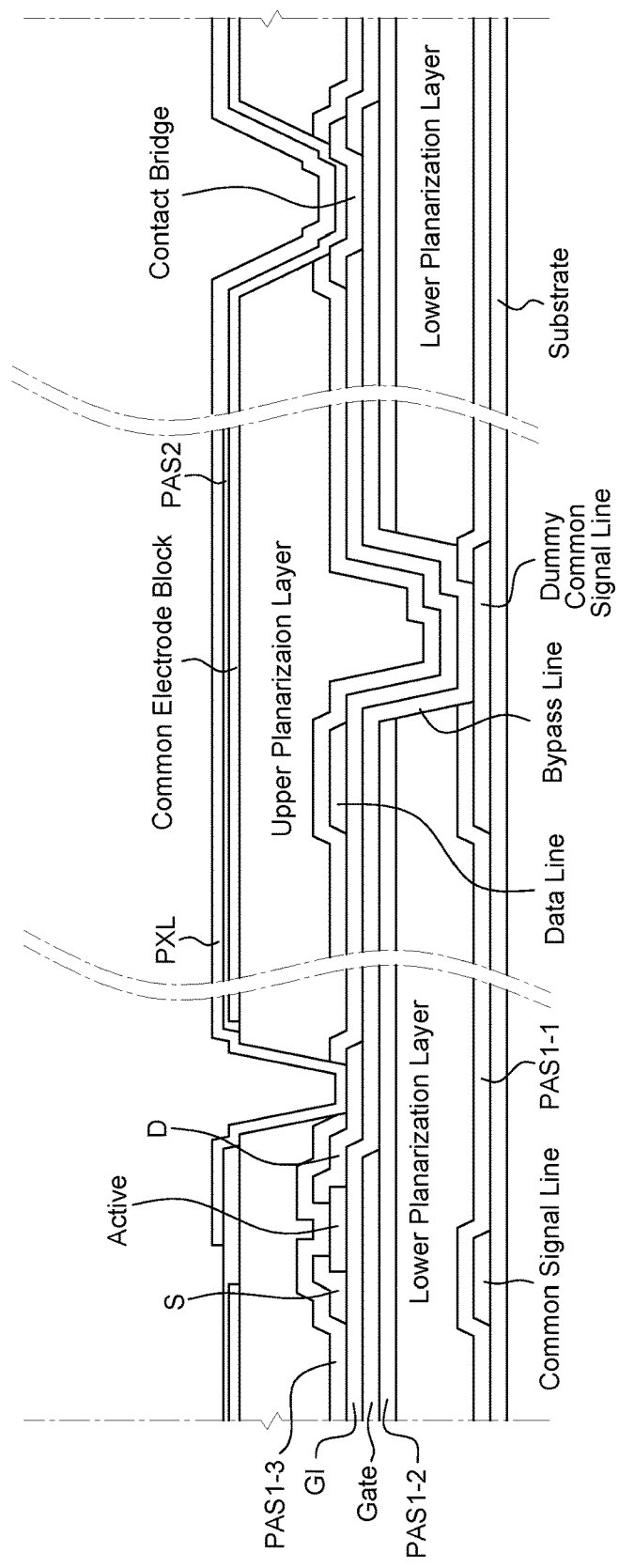
FIG. 6C is a schematic diagram of the illustrating layers on a substrate, according to one embodiment.

FIGS. 6A and 6B illustrate exemplary configurations of the dummy common signal lines. As shown, the dummy conductive lines do not interconnect the common electrode blocks. For instance, the dummy common signal lines can be formed such that they do not extend over the boundary of their respective common electrode block. The connection between the dummy common signal lines to the common electrode block can be made in the same way as the real common signal lines. In embodiments where the common signal lines and the dummy common signal lines are sandwiched between lower/upper planarization layers, each dummy common signal line can be connected to the corresponding common electrode block via the contact hole through the upper planarization layer. In embodiments where the common signal lines and the dummy common signal lines are provided under the TFT of the panel, each dummy common signal lines may be in contact with the bypass line connected to the corresponding common electrode block. Similar to the real common signal lines, each dummy common signal lines can contact the corresponding common electrode block at multiple locations by through multiple contact holes. In addition providing uniform data line capacitance in the pane, each dummy common signal lines can serve as a current path within the corresponding common electrode block.

In the embodiments disclosed in the present disclosure, the common signal lines are arranged parallel to the data line and routed directly towards the inactive area across the active area. By routing the common signal lines directly across the active area, the size of the inactive area at the side of the panel can be reduced. Further, the thickness of the passivation layer between the pixel electrode PXL and the common electrode blocks can be kept minimal to increase the capacitance of the pixel. Since, the common signal lines can be spaced farther away from the common electrode blocks, they can be provided with a desired thickness to decrease RC delays during touch-sensing period. In addition, there is no fringe field generated between the common electrode blocks and the common signal lines as the common electrode blocks positioned above the common signal lines. This effectively solves the light leakage problem caused by having the common signal lines in the same layer as the pixel electrode PXL.

In the embodiments of the present disclosure, the common electrode blocks and the common signal lines are described in reference to a touch recognition enabled LCD device. However, the use of the common electrode block and the common signal line is not limited to displaying images from the panel and identifying the location of touch inputs. However, the functionalities of the common electrode blocks and the common signal lines during other periods are not limited to activating the pixels (e.g., LCD pixel) as described above. In addition to touch-sensing functionality, the common electrode blocks and the common signal lines may be used in measuring amount of touch pressure on the screen, generating vibration on the screen or actuating electro-active materials in the panel.

For example, some embodiments of the display device 100 may include a layer of deformable material. The common electrode blocks may be interfaced or positioned near the deformable material, and loaded with voltage signals to measure electrical changes caused by the deformation of the deformable material. In such cases, the common electrode blocks can measure the amount of pressure on the display device 100 in addition to the location of the touch inputs. In some embodiments, the deformable material may be electro-active materials, which the amplitude and/or the frequency of the material can be controlled by electrical signals and/or electrical field. The examples of such deformable materials include piezo ceramic, electro-active-polymer and the like. In such embodiments, the common electrode blocks can be used to bend the deformable material into desired directions and/or to vibrate at desired frequencies, thereby providing tactile and/or texture feedback on the display device 100.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

What is claimed is:
1. A touch recognition enabled display, comprising:
   a plurality of groups of pixels, each pixel including a storage capacitor configured with a pixel electrode and a common electrode block, and the common electrode block is shared with the plurality of pixels among the pixels in the same group;
   a thin-film transistor (TFT) provided for each of the pixels, each TFT comprising a gate electrode connected to a gate line, a source electrode connected to a data line and a drain electrode connected to the pixel electrode;
   a plurality of common signal lines under one or more planarization layers, the one or more planarization layers separate the common signal lines from the pixel electrode and the common electrode block, wherein each of the plurality of common signal line is arranged to overlap one of the data lines and extend in the same direction as the data lines, and connected to the common electrode block of one group of the plurality of groups of pixels; and a plurality of bypass lines in a same layer as the gate line, wherein at least one of the plurality of bypass lines with respect to the common electrode block is connected with a common signal line of the plurality of common signal lines.

2. The touch recognition enabled display of claim 1, wherein the common electrode blocks for the plurality of groups of pixels are provided with a first signal during a display period and a second signal during a touch-sensing period.

3. The touch recognition enabled display of claim 2, wherein the common signal lines and the data lines are routed toward sources of the first and the second signals in a substantially parallel direction.

4. The touch recognition enabled display of claim 3, wherein the common signal lines connected to the common electrode blocks, except the common signal lines connected to the common electrode blocks in the row or the column closest to sources of the first and the second signals, are routed across at least one other common electrode block.

5. The touch recognition enabled display of claim 1, wherein the plurality of common signal lines are positioned under TFTs of the pixels, and the one or more planarization layers include a lower planarization layer under the TFTs of the pixels and an upper planarization layer covering the TFTs of the pixels.

6. The touch recognition enabled display of claim 5, wherein the lower planarization layer is formed of an inorganic material and the upper planarization layer is formed of an organic material.

7. The touch recognition enabled display of claim 5, wherein the lower planarization layer has higher thermal stability than the upper planarization layer.

8. The touch recognition enabled display of claim 5, wherein at least some of the plurality of bypass lines extend across at least two pixels.

9. The touch recognition enabled display of claim 5, wherein at least some of the plurality of bypass lines extend between two adjacent blue pixels among the same group of pixels.

10. The touch recognition enabled display of claim 5, wherein each of the plurality of common signal lines contacts the bypass line via a lower contact hole through the lower planarization layer, and each of the common electrode blocks contacts a bridge metal on the bypass line via an upper contact hole through the upper planarization layer.

11. The touch recognition enabled display of claim 10, wherein the plurality of common signal lines lines are formed of a first metal layer positioned below metal layers of the gate lines and the data lines.

12. The touch recognition enabled display of claim 11, wherein the TFTs of the pixels have a bottom gate structure such that the plurality of bypass lines and the gate lines are formed of a second metal layer above the first metal layer, and the data lines and the bridge metal are formed of a third metal layer above the second metal layer.

13. The touch recognition enabled display of claim 10, wherein the lower contact hole in the lower planarization layer is positioned at a location corresponding to a first blue pixel and the upper contact hole in the upper planarization layer is positioned at a location corresponding to a second blue pixel adjacent to the first blue pixel.

14. The touch recognition enabled display of claim 10, wherein a positioning of the lower contact hole and the upper contact hole for at least some of the plurality of bypass lines is in the opposite direction from a positioning of the lower contact hole and the upper contact hole of other bypass lines.

15. The touch recognition enabled display of claim 1, wherein the plurality of common signal lines are sandwiched between a lower planarization layer and an upper planarization layer, in which the lower planarization layer covers TFTs of the pixels and the upper planarization layer covers the plurality of common signal lines.

16. The touch recognition enabled display of claim 15, wherein each of the common signal lines are connected to the common electrode block of one of the pixel groups via a contact hole through the upper planarization layer.

17. The touch recognition enabled display of claim 15, wherein the plurality of common signal lines are formed of a metal layer positioned above metal layers of the gate lines and the data lines, but positioned under layers of the pixel electrodes and the common electrode blocks.

18. The touch recognition enabled display of claim 15, wherein both the lower planarization layer and the upper planarization layer are formed of an organic material.

19. The touch recognition enabled display of claim 4, further comprising a plurality of touch-driving regions and a plurality of touch-sensing regions, wherein the plurality of common signal lines are selectively connected together to form a plurality of groups of common electrode blocks that serve as the touch-driving regions.

20. The touch recognition enabled display of claim 4, wherein each common electrode block for each of the plurality of groups of pixels serves one of as a touch-driving region or as a touch-sensing region.

* * * * *